United States Patent
Albrecht et al.

(10) Patent No.: US 8,257,598 B2
(45) Date of Patent: *Sep. 4, 2012

(54) METHOD USING BLOCK COPOLYMERS FOR MAKING A MASTER MOLD WITH HIGH BIT-ASPECT-RATIO FOR NANOIMPRINTING PATTERNED MAGNETIC RECORDING DISKS

(75) Inventors: Thomas R. Albrecht, San Jose, CA (US); Ricardo Ruiz, San Bruno, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,385

(22) Filed: Jan. 17, 2012

(65) Prior Publication Data

US 2012/0111827 A1    May 10, 2012

Related U.S. Application Data

(63) Continuation of application No. 12/141,062, filed on Jun. 17, 2008, now Pat. No. 8,119,017.

(51) Int. Cl.
*B44C 1/22* (2006.01)
*C03C 15/00* (2006.01)
*C03C 25/68* (2006.01)
*H01L 21/302* (2006.01)
*H01L 21/461* (2006.01)

(52) U.S. Cl. ............... 216/22; 216/41; 216/48; 216/58; 216/63; 216/67; 438/689; 438/706; 438/710

(58) Field of Classification Search .............. 216/22, 216/41, 48, 49, 58, 63, 67; 438/689, 694, 438/706, 710

See application file for complete search history.

(56) References Cited

U.S. PATENT DOCUMENTS 5,766,718 A    6/1998   Matsuda et al.
(Continued)

FOREIGN PATENT DOCUMENTS

JP    2000113533    4/2000
(Continued)

OTHER PUBLICATIONS

Bandic et al., "Patterned magnetic media: impact of nanoscale patterning on hard disk drives", Solid State Technology S7+ Suppl. S, Sep. 2006.

(Continued)

*Primary Examiner* — Parviz Hassanzadeh
*Assistant Examiner* — Margaret D Klunk
(74) *Attorney, Agent, or Firm* — Thomas R. Berthold

(57) ABSTRACT

The invention is a method for making a master mold to be used for nanoimprinting patterned-media magnetic recording disks. The method uses conventional optical or e-beam lithography to form a pattern of generally radial stripes on a substrate, with the stripes being grouped into annular zones or bands. A block copolymer material is deposited on the pattern, resulting in guided self-assembly of the block copolymer into its components to multiply the generally radial stripes into generally radial lines of alternating block copolymer components. The radial lines of one of the components are removed and the radial lines of the remaining component are used as an etch mask to etch the substrate. Conventional lithography is used to form concentric rings over the generally radial lines. After etching and resist removal, the master mold has pillars arranged in circular rings, with the rings grouped into annular bands.

16 Claims, 14 Drawing Sheets

U.S. PATENT DOCUMENTS

| | | | |
|---|---|---|---|
| 5,772,905 | A | 6/1998 | Chou |
| 6,042,998 | A | 3/2000 | Brueck et al. |
| 6,421,195 | B1 | 7/2002 | Rubin et al. |
| 6,746,825 | B2 | 6/2004 | Nealey et al. |
| 6,977,108 | B2 | 12/2005 | Hieda et al. |
| 7,080,596 | B2 | 7/2006 | Lee et al. |
| 7,347,953 | B2 | 3/2008 | Black et al. |
| 7,521,094 | B1 | 4/2009 | Cheng et al. |
| 7,976,715 | B2 | 7/2011 | Dobisz et al. |
| 8,119,017 | B2 * | 2/2012 | Albrecht et al. ............ 216/22 |
| 2002/0168548 | A1 | 11/2002 | Sakurai et al. |
| 2004/0241574 | A1 | 12/2004 | Dai et al. |
| 2005/0094549 | A1 | 5/2005 | Hieda et al. |
| 2006/0134556 | A1 | 6/2006 | Nealey et al. |
| 2006/0276043 | A1 | 12/2006 | Johnson et al. |
| 2007/0092650 | A1 | 4/2007 | Albrecht et al. |
| 2007/0121375 | A1 | 5/2007 | Sewell |
| 2008/0002295 | A1 | 1/2008 | Sakurai et al. |
| 2008/0192606 | A1 | 8/2008 | Kimura et al. |
| 2009/0029191 | A1 * | 1/2009 | Albrecht ............ 428/848 |

FOREIGN PATENT DOCUMENTS

| | | |
|---|---|---|
| WO | 2007058324 | 5/2007 |

OTHER PUBLICATIONS

Terris et al., "Topical Review: Nanofabricated and self-assembled magnetic structures as data storage media", J. Phys. D: Appl. Phys. 38 (2005) R199-R222.

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

Kim et al.,"Rapid Directed Self-Assembly of Lamellar Microdomains from a Block Copolymer Containing Hybrid", Proc. of SPIE vol. 6921, 692129, (2008).

Kim et al., "Device-Oriented Directed Self-Assembly of Lamella Microdomains from a Block Copolymer Containing Hybrid", Proc. of SPIE vol. 6921, 69212B, (2008).

Kim et al., "Self-Aligned, Self-Assembled Organosilicate Line Patterns of ~20nm Half-Pitch from Block Copolymer Mediated Self-Assembly", Proc. of SPIE vol. 6519, 65191H, (2007).

Edwards et al. "Dimensions and Shapes of Block Copolymer Domains Assembled on Lithographically Defined Chemical Patterned Substrates." Dec. 14, 2006. Macromolecules, 2007, 40, 90-96.

* cited by examiner

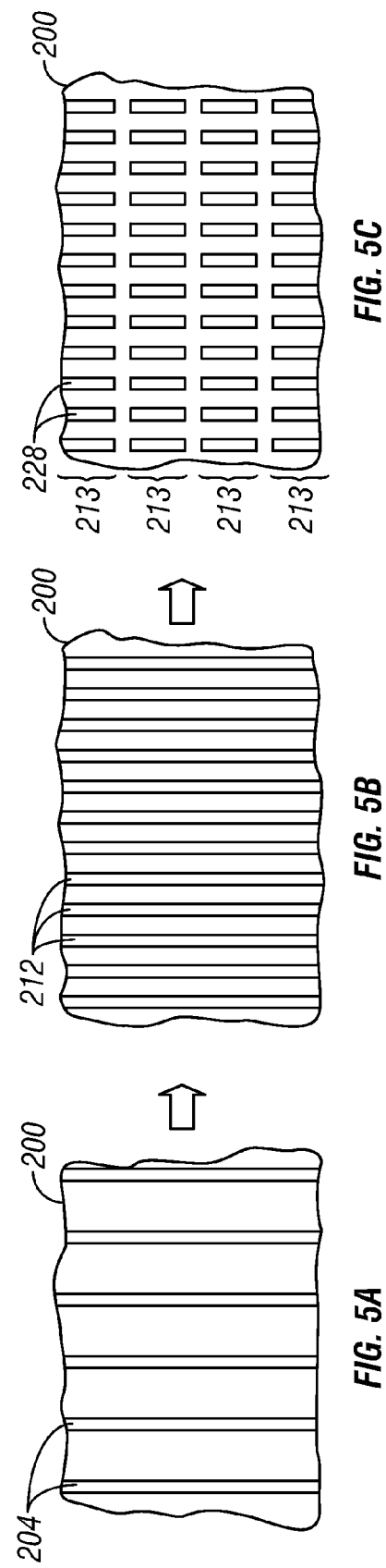

METHOD USING BLOCK COPOLYMERS FOR MAKING A MASTER MOLD WITH HIGH BIT-ASPECT-RATIO FOR NANOIMPRINTING PATTERNED MAGNETIC RECORDING DISKS

RELATED APPLICATION

This application is a Continuation of application Ser. No. 12/141,062 filed Jun. 17, 2008 now U.S. Pat. No. 8,119,017.

BACKGROUND OF THE INVENTION

1. Field of the Invention

This invention relates generally to patterned-media magnetic recording disks, wherein each data bit is stored in a magnetically isolated data island on the disk, and more particularly to a method for making a master mold to be used for nanoimprinting the patterned-media disks.

2. Description of the Related Art

Magnetic recording hard disk drives with patterned magnetic recording media have been proposed to increase data density. In patterned media, the magnetic recording layer on the disk is patterned into small isolated data islands arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or mold, sometimes also called a "stamper", that has a topographic surface pattern. In this method the magnetic recording disk substrate with a polymer film on its surface is pressed against the mold. The polymer film receives the reverse image of the mold pattern and then becomes a mask for subsequent etching of the disk substrate to form the pillars on the disk. The magnetic layer and other layers needed for the magnetic recording disk are then deposited onto the etched disk substrate and the tops of the pillars to form the patterned-media disk. The mold may be a master mold for directly imprinting the disks. However, the more likely approach is to fabricate a master mold with a pattern of pillars corresponding to the pattern of pillars desired for the disks and to use this master mold to fabricate replica molds. The replica molds will thus have a pattern of holes corresponding to the pattern of pillars on the master mold. The replica molds are then used to directly imprint the disks. Nanoimprinting of patterned media is described by Bandic et al., "Patterned magnetic media: impact of nanoscale patterning on hard disk drives", *Solid State Technology* S7+*Suppl. S, September* 2006; and by Terris et al., "TOPICAL REVIEW: Nanofabricated and self-assembled magnetic structures as data storage media", *J. Phys. D: Appl. Phys.* 38(2005) R199-R222.

In patterned media, there are two opposing requirements relating to the bit-aspect-ratio (BAR) of the pattern or array of discrete data islands arranged in concentric tracks. The BAR is the ratio of track spacing or pitch in the radial or cross-track direction to the island spacing or pitch in the circumferential or along-the-track direction, which is the same as the ratio of linear island density in bits per inch (BPI) in the along-the-track direction to the track density in tracks per inch (TPI) in the cross-track direction. The BAR is also equal to the ratio of the radial dimension of the bit cell to the circumferential dimension of the bit cell, where the data island is located within the bit cell. The bit cell includes not only the magnetic data island but also one-half of the nonmagnetic space between the data island and its immediately adjacent data islands. The data islands have an island aspect ratio (IAR) or radial length to circumferential that is generally close to the BAR. The first requirement is that to minimize the resolution requirement for fabricating the islands, it is preferable that the array of islands have a low BAR (about 1). The second requirement is that to allow for a wider write head pole, which is necessary for achieving a high write field to allow the use of high coercivity media for thermal stability, it is preferable that the array of islands have a higher BAR (about 2 or greater). Also, the transition from disk drives with conventional continuous media to disk drives with patterned media is simplified if the BAR is high because in conventional disk drives the BAR is between about 5 to 10. Other benefits of higher BAR include lower track density, which simplifies the head-positioning servo requirements, and a higher data rate.

The making of the master template or mold is a difficult and challenging process. The use of electron beam (e-beam) lithography using a Gaussian beam rotary-stage e-beam writer is viewed as a possible method to make a master mold capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/in$^2$. To achieve patterned-media disks with both an ultra-high areal bit density (around 1 Terabits/in$^2$) and a higher BAR, a track pitch of 50 nm and an island pitch of about 12.5 nm will be required, which would result in a BAR of 4. However, a master mold capable of nanoimprinting patterned-media disks with an island pitch of 12.5 nm is not achievable with the resolution of e-beam lithography.

What is needed is a master mold and a method for making it that can result in patterned-media magnetic recording disks with both the required high areal bit density and higher BAR (about 2 or greater).

SUMMARY OF THE INVENTION

The invention is a method for making a master mold to be used for nanoimprinting patterned-media magnetic recording disks with a BAR greater than 1, preferably about 2 or greater. The method uses conventional optical or e-beam lithography to form a pattern of generally radial stripes on a substrate, with the stripes being grouped into annular zones or bands. A block copolymer material is deposited on the pattern, resulting in guided self-assembly of the block copolymer into its components to multiply the generally radial stripes into generally radial lines of alternating block copolymer components. The radial lines of one of the components are removed and the radial lines of the remaining component are used as an etch mask to etch the substrate. Conventional lithography is used to form concentric rings over the generally radial lines. After etching and resist removal, the master mold has pillars arranged in circular rings, with the rings grouped into annular bands. The spacing of the concentric rings is selected so that following the etching process the master mold has an array of pillars with the desired BAR, which is greater than 1, preferably about 2 or greater. The master mold may be used to directly nanoimprint the disks, but more likely is used to make replica molds which are then used to directly nanoimprint the disks.

The block copolymer may be a diblock copolymer of A and B components having the structure (A-b-B), such as polystyrene-block-polymethylmethacrylate (PS-b-PMMA). The ratio of the molecular weight of the A component to the molecular weight of the B component is selected so that the radial lines of the A component are formed either as cylinders in a matrix of the B component or as alternating lamellae separated by alternating lamellae of the B component. The two or more immiscible polymeric block components microphase separate into two or more different microdomains on a nanometer scale and thereby form ordered patterns of isolated nano-sized structural units having a periodicity or bulk period ($L_0$) of the repeating A-B domain units. The block copolymer is selected to have $L_0$ in the range of between about 8 nm and 25 nm, which corresponds to the circumferential spacing of the A-component radial lines to be used as the etch mask. However, the generally radial stripes used to guide the self-assembly of the block copolymer into its A and B components have a circumferential spacing of approximately $nL_0$, where n is an integer greater than or equal to 2.

For a fuller understanding of the nature and advantages of the present invention, reference should be made to the following detailed description taken together with the accompanying figures.

BRIEF DESCRIPTION OF THE DRAWING

FIGS. 5A, 5B and 5C are views of a small portion of one annular band of the master mold at successive stages of the method of making the master mold according to the present invention.

DETAILED DESCRIPTION OF THE INVENTION

Figure 1:
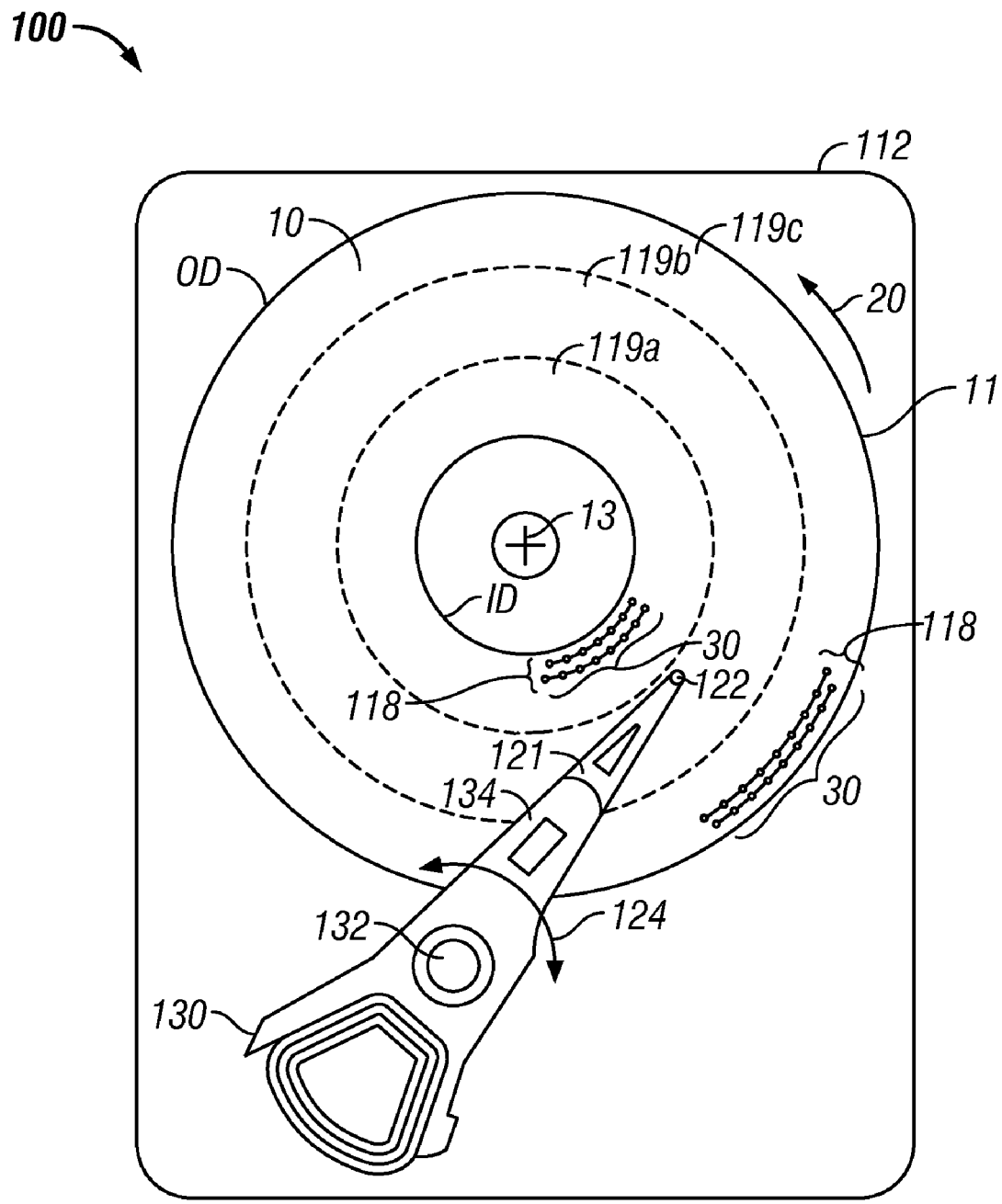
FIG. 1 is a top view of a disk drive with a patterned-media type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. The grouping of the data tracks into annular bands permits banded recording, wherein the angular spacing of the data islands, and thus the data rate, is different in each band. In FIG. 1, only a few islands 30 and representative tracks 118 are shown in the inner band 119a and the outer band 119c. As the disk 10 rotates about its center 13 in the direction of arrow 20, the movement of actuator 130 allows the read/write head on the trailing end of head carrier 122 to access different data tracks 118 on disk 10. Rotation of the actuator 130 about pivot 132 to cause the read/write head on the trailing end of head carrier 122 to move from near the disk inside diameter (ID) to near the disk outside diameter (OD) will result in the read/write head making an arcuate path across the disk 10.

Figure 2:
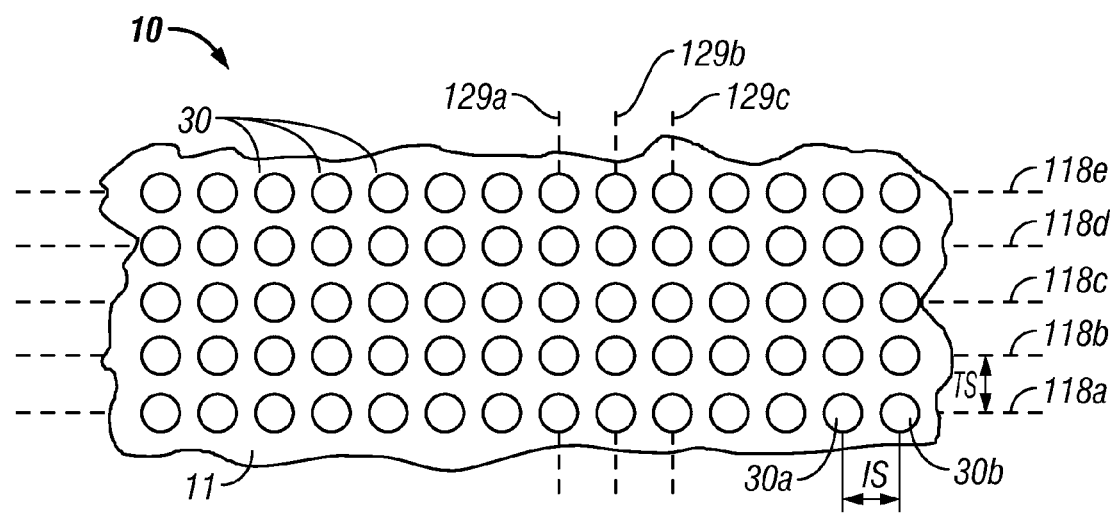
FIG. 2 is a top view of an enlarged portion of a patterned-media type of magnetic recording disk showing the detailed arrangement of the data islands in one of the bands on the surface of the disk substrate.

FIG. 2 is a top view of an enlarged portion of disk 10 showing the detailed arrangement of the data islands 30 in one of the bands on the surface of disk substrate 11 according to the prior art. The islands 30 are shown as being circularly shaped and thus have a BAR of 1. The islands 30 contain magnetizable recording material and are arranged in tracks spaced-apart in the radial or cross-track direction, as shown by tracks 118a-118e. The tracks are typically spaced apart by a nearly fixed track pitch or spacing TS. Within each track 118a-118e, the islands 30 are roughly equally spaced apart by a nearly fixed along-the-track island pitch or spacing IS, as shown by typical islands 30a, 30b, where IS is the spacing between the centers of two adjacent islands in a track. The islands 30 are also arranged into generally radial lines, as shown by radial lines 129a, 129b and 129c that extend from disk center 13 (FIG. 1). Because FIG. 2 shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The generally radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 3:
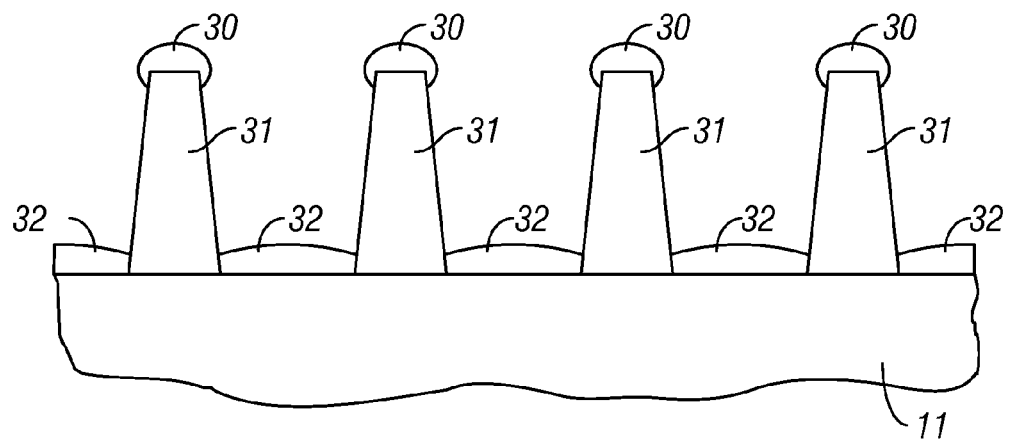
FIG. 3 is a side sectional view of one type of a patterned-media disk showing the data islands as elevated, spaced-apart pillars that extend above the disk substrate surface with trenches between the pillars.

Patterned-media disks like that shown in FIG. 2 may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or mold. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

Figure 4:
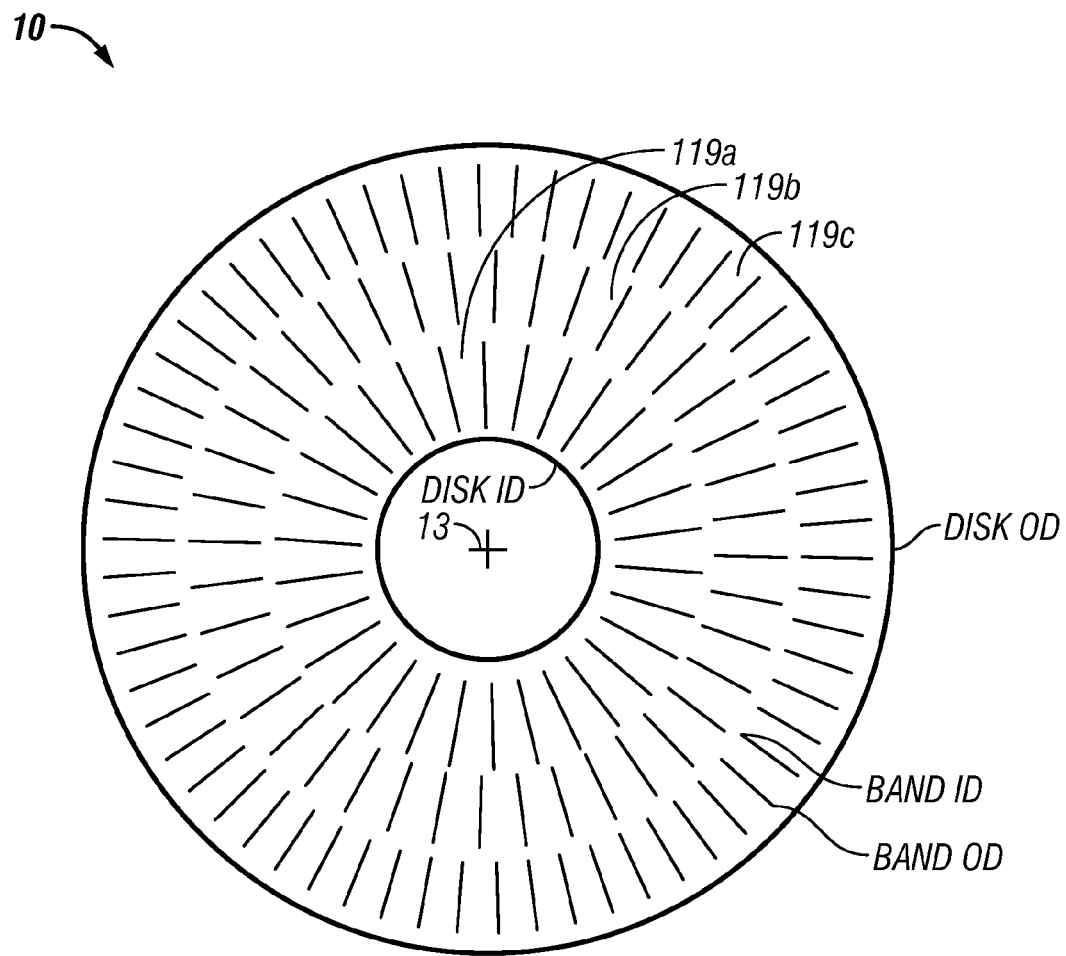
FIG. 4 is a schematic view of a patterned-media disk showing a pattern of radial lines in three annular bands, with each radial line meant to represent data islands from all the concentric tracks in the band.

FIG. 4 is a schematic view of patterned-media disk 10 showing a pattern of radial lines in three annular bands 119a-119c. Each radial line is meant to represent data islands from all the concentric tracks in the band. The circumferential density of the radial lines is similar in all three bands, with the angular spacing of the lines being adjusted in the bands to have smaller angular spacing in the direction from the disk inside diameter (ID) to outside diameter (OD), so that the circumferential density of the radial lines, and thus the "linear" or along-the-track density of data islands, stays relatively constant over all the bands on the disk. In actuality, a typical disk is divided into about 20 annular bands, which allows the linear density to remain constant to within a few percent across all bands. Within each band, the radial lines are subdivided (not shown) into very short radial segments or lengths arranged in concentric rings, with each ring being a data track and each radial segment or length being a discrete data island. Each annular band, like band 119c, has a band ID and a band OD. Also, in actuality the generally radial lines are more typically generally arcuate lines that replicate the path of the read/write head mounted on the end of the rotary actuator.

The making of the master template or mold to achieve an ultrahigh density patterned-media disk is a difficult and challenging process. The use of electron beam (e-beam) lithography using a Gaussian beam rotary-stage e-beam writer is viewed as a possible method to make the master mold. However, to achieve patterned-media disks with both higher areal bit density (around 1 Tbit/in$^2$) and a higher BAR, a track pitch of about 50 nm and an island pitch of about 12.5 nm will be required, which would result in a BAR of 4. A master mold capable of nanoimprinting patterned-media disks with an island pitch of 12.5 nm is difficult to fabricate due to the limited resolution of e-beam lithography.

The present invention relates to a method for making a master mold that is used in the nanoimprinting process to make patterned-media disks with an island pitch difficult to achieve with the resolution of e-beam lithography, thus enabling both higher areal bit density (1 Tbit/in$^2$ and higher) and a high BAR (greater than 1). The master mold may be used to directly nanoimprint the disks, but more likely is used to make replica molds which are then used to directly nanoimprint the disks. The method uses conventional or e-beam lithography to form a pattern of generally radial stripes on a substrate, with the stripes being grouped into annular zones or bands. A block copolymer material is deposited on the pattern, resulting in guided self-assembly of the block copolymer into its components to multiply the generally radial stripes into generally radial lines. The radial lines preferably have a higher circumferential density than that of the radial stripes. Conventional lithography is then used to form concentric rings over the generally radial lines. After etching and resist removal, the master mold has pillars arranged in circular rings, with the rings grouped into annular bands. The spacing of the concentric rings is selected so that following the etching process the master mold has an array of pillars with the desired BAR, which is greater than 1, preferably about 2 or greater. Because the invention allows the circumferential density of the master mold pillars to be at least doubled from what could be achieved with just e-beam lithography, the subsequently nanoimprinted patterned-media disks can have both a high BAR (greater than 1 and preferably about 2 or greater) and an ultra-high areal density.

A high-level representation of the method of the invention is shown in FIGS. 5A-5C, which show a small portion of one annular band of the master mold with the radial or cross-track direction being vertical and the circumferential or along-the-track direction being horizontal. In FIG. 5A, the first step is to create a pattern of generally radial stripes 204 on substrate 200 at a density achievable by conventional e-beam or other lithography. Next, in FIG. 5B, the circumferential density of radial stripes 204 is multiplied by two as a result of guided self-assembly of block copolymer material into its components, resulting in generally radial lines 212 representing one of the block copolymer components. The radial lines 212 are used as an etch mask to etch radial lines in the substrate and a second conventional e-beam or other lithography step is performed to cut the radial lines of substrate material into circumferential segments 213 of pillars 228. The pillars 228 correspond to the data islands and the segments 213 correspond to the data tracks on the disks that will be nanoimprinted. The pillars 228 have a circumferential pitch difficult to achieve with the resolution of e-beam lithography. The array of pillars 228 has a BAR greater than 1, preferably about 2 or greater.

Self-assembling block copolymers have been proposed for creating periodic nanometer (nm) scale features. A self-assembling block copolymer typically contains two or more different polymeric block components, for example components A and B, that are immiscible with one another. Under suitable conditions, the two or more immiscible polymeric block components separate into two or more different phases or microdomains on a nanometer scale and thereby form ordered patterns of isolated nano-sized structural units. There are many types of block copolymers that can be used for forming the self-assembled periodic patterns. If one of the components A or B is selectively removable without having to remove the other, then an orderly arranged structural units of the un-removed component can be formed. There are numerous references describing self-assembling block copolymers, including U.S. Pat. No. 7,347,953 B2; Kim et al., "Rapid Directed Self-Assembly of Lamellar Microdomains from a Block Copolymer Containing Hybrid", *Proc. of SPIE* Vol. 6921, 692129, (2008); Kim et al., "Device-Oriented Directed Self-Assembly of Lamella Microdomains from a Block Copolymer Containing Hybrid", *Proc. of SPIE* Vol. 6921, 69212B, (2008); and Kim et al., "Self-Aligned, Self-Assembled Organosilicate Line Patterns of ~20 nm Half-Pitch from Block Copolymer Mediated Self-Assembly", *Proc. of SPIE* Vol. 6519, 65191H, (2007).

Specific examples of suitable block copolymers that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

The specific self-assembled periodic patterns formed by the block copolymer are determined by the molecular volume ratio between the first and second polymeric block components A and B. When the ratio of the molecular volume of the second polymeric block component B over the molecular volume of the first polymeric block component A is less than about 80:20 but greater than about 60:40, the block copolymer will form an ordered array of cylinders composed of the first polymeric block component A in a matrix composed of the second polymeric block component B. When the ratio of the molecular volume of the first polymeric block component A over the molecular volume of the second polymeric block component B is less than about 60:40 but is greater than about 40:60, the block copolymer will form alternating lamellae composed of the first and second polymeric block components A and B. In the present invention, the un-removed component is to be used as an etch mask for forming the generally radial lines, as shown in FIG. 5B, so ordered arrays of alternating lamellae and alternating cylinders are of interest.

The periodicity or bulk period ($L_0$) of the repeating structural units in the periodic pattern is determined by intrinsic polymeric properties such as the degree of polymerization N and the Flory-Huggins interaction parameter $\chi$. $L_0$ scales with the degree of polymerization N, which in turn correlates with the molecular weight M. Therefore, by adjusting the total molecular weight of the block copolymer of the present invention, the bulk period ($L_0$) of the repeating structural units can be selected.

To form the self-assembled periodic patterns, the block copolymer is first dissolved in a suitable solvent system to form a block copolymer solution, which is then applied onto the substrate surface to form a thin block copolymer layer, followed by annealing of the thin block copolymer layer, which causes phase separation between the different polymeric block components contained in the block copolymer. The solvent system used for dissolving the block copolymer and forming the block copolymer solution may comprise any suitable solvent, including, but not limited to: toluene, propylene glycol monomethyl ether acetate (PGMEA), propylene glycol monomethyl ether (PGME), and acetone. The block copolymer solution can be applied to the substrate surface by any suitable techniques, including, but not limited to: spin casting, coating, spraying, ink coating, dip coating, etc. Preferably, the block copolymer solution is spin cast onto the substrate surface to form a thin block copolymer layer. After application of the thin block copolymer layer onto the substrate surface, the entire substrate is annealed to effectuate microphase segregation of the different block components contained by the block copolymer, thereby forming the periodic patterns with repeating structural units.

The block copolymer films in the above-described techniques self-assemble without any direction or guidance. This undirected self-assembly results in patterns with defects so it is not practical for applications that require long-range ordering, such as for making annular bands of radial lines on a master mold for nanoimprinting patterned-media disks.

Lithographically patterned surfaces have been proposed to guide or direct the self-assembly of block copolymer domains. One approach uses interferometric lithography to achieve ordering of the domains with registration of the underlying chemical contrast pattern on the substrate. Lamellar and cylindrical domains may be formed on a substrate by this technique, as described in U.S. Pat. No. 6,746,825. However, interferometric lithography cannot be used to make annular bands of radial lines. US 2006/0134556 A1 describes techniques for creating a chemical contrast pattern to guide the self-assembly of block copolymers to form aperiodic patterns. Also, in both of these approaches to create chemical contrast patterns on the substrate to guide the self-assembly of block copolymers, the periodicity of the underlying chemical contrast pattern matches the bulk period $L_0$ of the block copolymer. For example, in US 2006/0134556A1, $L_0$ is about 40 nm, so the lithographically-patterned substrate used to guide the self-assembly also has a period of about 40 nm, which can be achieved by conventional or e-beam lithography. However, it is difficult to use conventional or e-beam lithography to create a chemical contrast pattern for a block copolymer with $L_0$ between about 8 nm and 25 nm.

A first embodiment of the method of this invention for making the master mold will now be explained with respect to FIGS. 6A-6L. FIGS. 6A-6C, 6E-6G and 6I are side sectional views, at various stages of the fabrication method, taken through a plane generally perpendicular to the radial direction, and FIGS. 6D, 6H and 6J-6L are top views at various stages of the method.

Figure 6A:
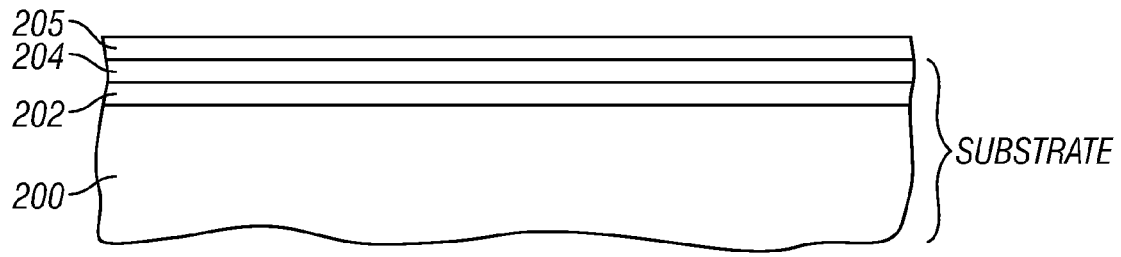
FIGS. 6A-6C are side sectional views, at various stages of one embodiment of the method for making the master mold, taken through a plane generally perpendicular to the radial direction.

In this first embodiment of the method, as shown in FIG. 6A, the master mold substrate comprises a base 200, which may be formed of Si or $SiO_2$, a first substrate layer 202, which is preferably about a 10 nm thick amorphous carbon layer, and second substrate layer 204, which is preferably about a 5 nm thick layer of germanium (Ge). Other combinations of materials can be used, as long as materials and etchants can be chosen to allow selective removal of the materials (without disturbing the others) as needed for the described processes that follow. Examples of materials for the first layer 202 include Al, carbon, Cr, $Si_3N_4$, and variety of other materials that can withstand a reactive-ion-etch (RIE) process used to etch the quartz substrate. If a different substrate material is used, the choice of materials for layer 202 is further broadened. For the second layer 204, one of the following materials (but different from the material of the first layer 202) may be used: Cr, Al, $SiO_2$, Si, Ge, carbon, $Si_3N_4$, W, or a variety of other materials, as long as they can withstand the RIE used to etch the first layer.

The Ge layer 204 will have a native Ge-oxide film on its surface. A neutral layer 205 of a material that does not show a strong wetting affinity by one of the polymer blocks over the other is deposited onto the Ge layer 204. The neutral layer can be, but is not restricted to, a functionalized polymer brush, a cross-linkable polymer, a functionalized polymer "A" or "B" or a functionalized random copolymer "A-r-B" or a blend of "A" and "B", where "A" and "B" are the constituent block materials of the block copolymer. The functional group may be, for example, a hydroxyl group. In the present example, the neutral layer 205 is a hydroxyl-terminated polystyrene brush of lower molecular weight than the block copolymer used. The brush material is spin-coated on Ge layer 204 to a thickness of about 1-10 nm (below 6 nm is preferred). The purpose of the neutral layer is to tune the surface energy adequately to promote the desired domain orientation (perpendicular lamellae or parallel cylinders) and to provide the adequate wetting conditions for density multiplication.

Figure 6B:
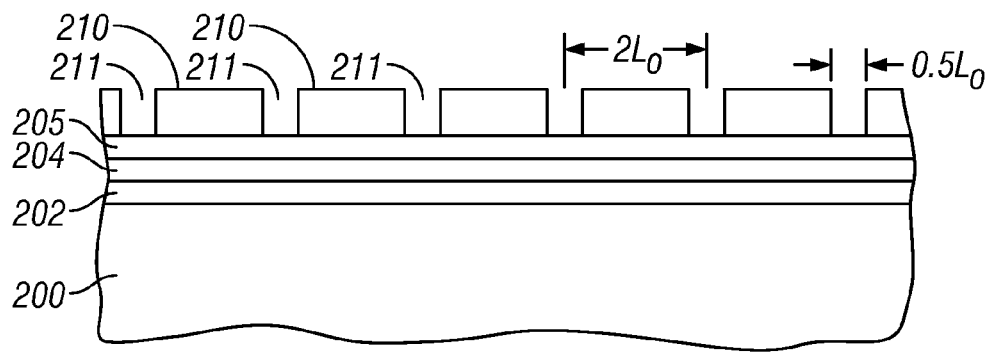

In FIG. 6B a resist layer has been deposited on brush layer 205 and patterned into generally radial bars 210 of resist. The resist layer is patterned by e-beam and developed to form the pattern of radial bars 210 separated by radial spaces 211 that expose portions of brush layer 205. The e-beam tool patterns the resist layer so that the radial spaces 211 have a circumferential spacing that is approximately an integer multiple of $L_0$ (i.e., $nL_0$), the known bulk period for the selected block copolymer that will be subsequently deposited. In FIG. 6B, n is 2. The circumferential width of each radial space 211 is selected to be approximately $0.5L_0$.

Figure 6C:
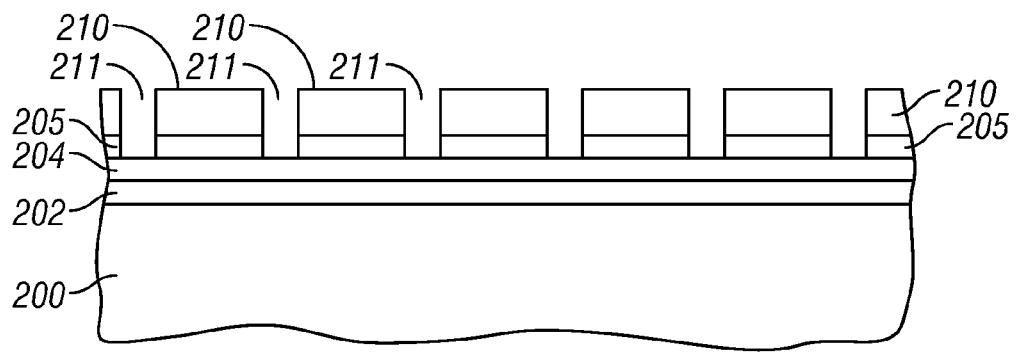
Figure 6D:
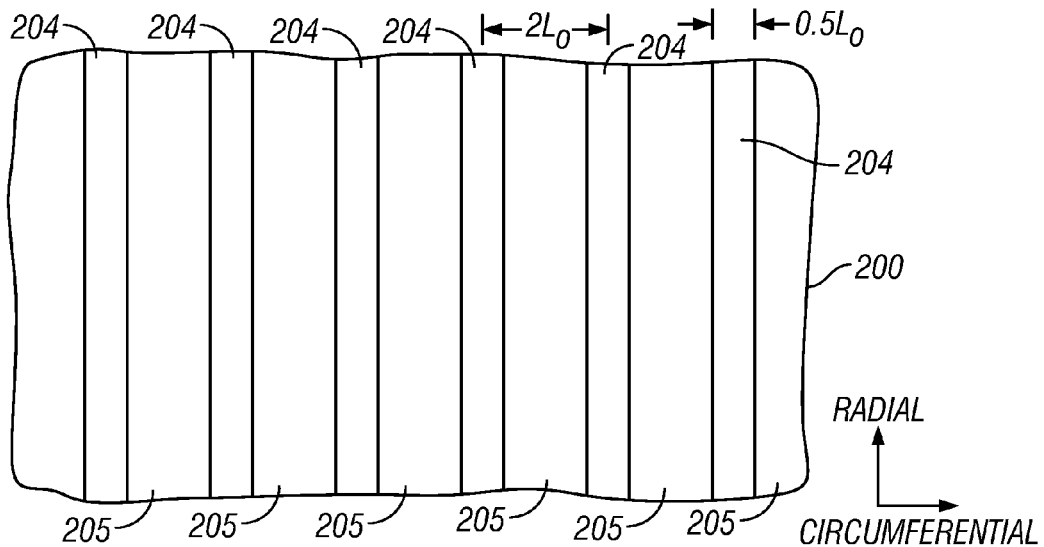
FIG. 6D is a top view of one stage of one embodiment of the method for making the master mold.

In FIG. 6C, the structure is etched, by a process of oxygen plasma reactive ion etching ($O_2$ RIE), to remove portions of brush layer 205 in the radial spaces 211, which exposes portions of Ge layer as generally radial stripes 204. Alternatively, the chemical structure of the exposed portions of brush layer 205 in the radial spaces 211 can be altered so that they have a preferred affinity for one of the copolymers. In FIG. 6D, which is a top view, the resist 210 is removed, leaving on the substrate a pattern of generally radial bars 205 of polymer brush material separated by generally radial stripes 204 of Ge. In this pattern the generally radial stripes 204 have a circumferential width of $0.54L_0$ and a circumferential pitch of $2L_0$. The structure in FIG. 6D, with generally radial stripes 204, corresponds generally to the step shown in FIG. 5A. Because FIG. 6D is only a very small portion of the master mold, the stripes 204 appear as parallel stripes. However, the stripes 204 are arranged generally radially, as depicted in FIG. 4. The stripes 204 may be perfectly straight radial stripes but are preferably arcs or arcuate-shaped radial stripes that replicate the arcuate path of the read/write head on the rotary actuator.

Figure 6E:
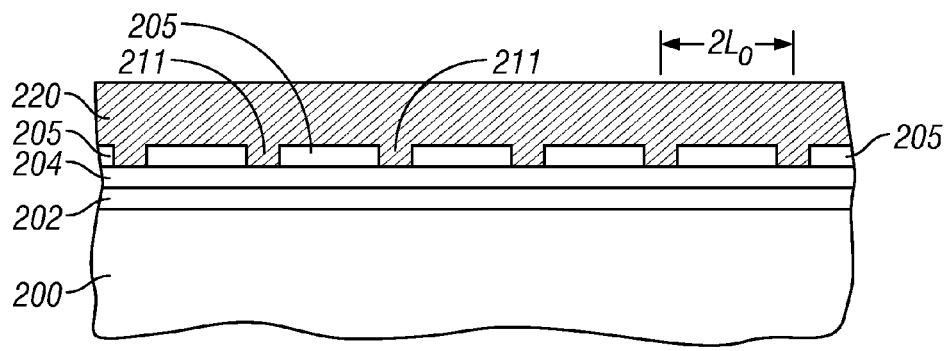
FIGS. 6E-6G are side sectional views, at various stages of one embodiment of the method for making the master mold, taken through a plane generally perpendicular to the radial direction.

Next, in FIG. 6E, a layer 220 of block copolymer material is deposited over the radial bars 205 of brush material and the radial stripes 204 of Ge layer (or chemically altered brush) in the radial spaces 211. The preferred block copolymer material is the diblock copolymer polystyrene-block-polymethylmethacrylate (PS-b-PMMA) with $L_0$ between about 8 nm and 25 nm and is deposited by spin coating to a thickness of about $0.5L_0$ to $3L_0$.

Figure 6F:
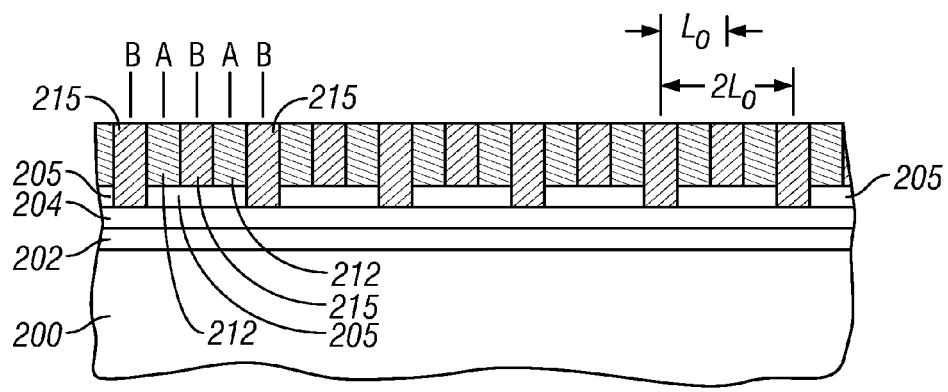

In FIG. 6F, the block copolymer layer has been annealed, which results in phase separation between the different components contained in the block copolymer. In this example, the B component (PMMA) has an affinity for the oxide surface of the Ge stripes or for the polar groups of the chemically altered brush 204 and thus form as generally radial lines 215 on top of the radial Ge stripes 204. Because the circumferential width of the Ge stripes 204 is approximately $0.5L_0$, the A component (PS) form in adjacent radial lines 212 on the radial bars 205 of polymer brush material. As a result of the self-assembly of the A and B components this causes the B component to also form as generally radial lines 215 on the centers of each radial bar 205 of polymer brush material. The generally radial Ge stripes 204 (or chemically altered brush) thus guide the self-assembly of the PS and PMMA components to form the alternating radial lines 212, 215 in the structure as shown in FIG. 6F. Although the A and B components prefer to self-assemble in parallel lines with a period of $L_0$, the substrate pattern of radial stripes 204 guides the alternating lines 212, 215 to form as radial lines, which means that that $L_0$ cannot be constant over the entire radial length. However, a pattern of alternating radial lines 212, 215 can be accomplished without any significant defects if the variation from $L_0$ does not exceed approximately 10 percent. Thus, to achieve this, the circumferential spacing of the radial stripes 204 at the band ID should not be less than about $0.9nL_0$ and the circumferential spacing of the radial stripes 204 at the band OD should not be greater than about $1.1nL_0$.

Figure 6G:
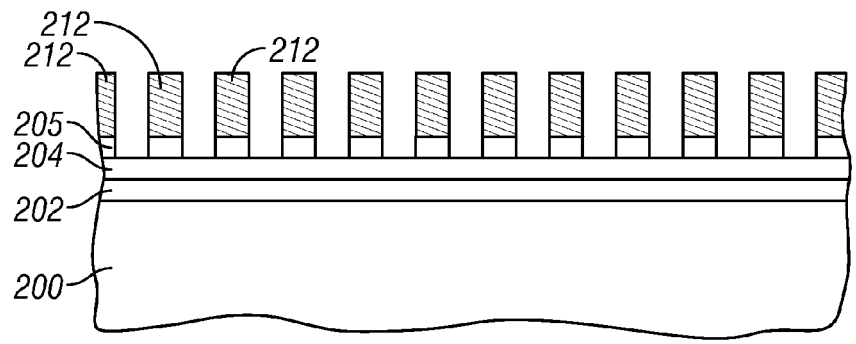
Figure 6H:
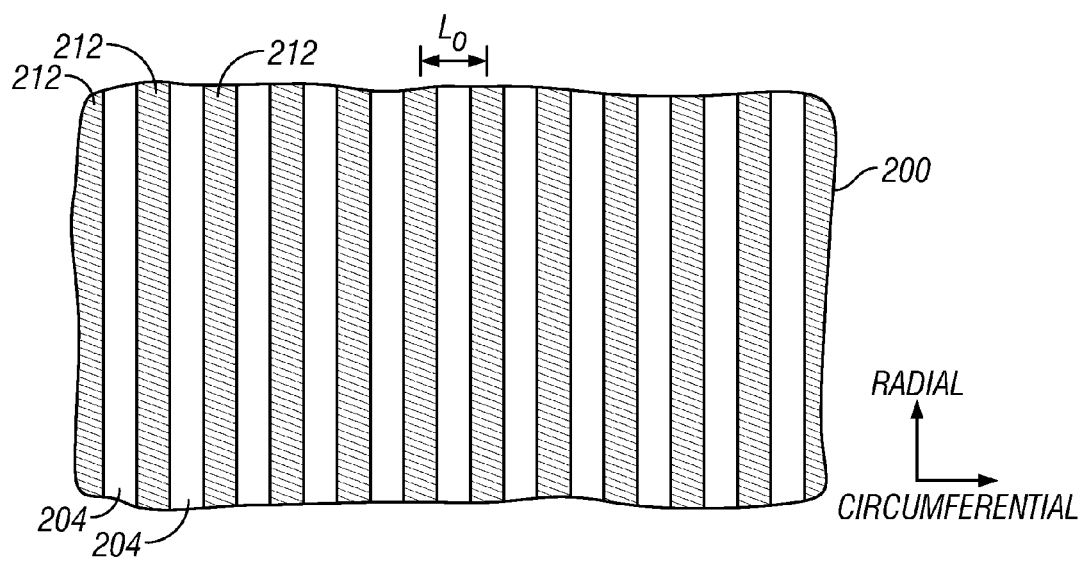
FIG. 6H is a top view of one stage of one embodiment of the method for making the master mold.

Next, in FIG. 6G, the B component (PMMA) is selectively removed by a wet etch (acetic acid, IPA or other selective solvent) or a dry etch process ($O_2$ RIE), leaving generally radial lines 212 of the A component (PS). FIG. 6H is a top view of FIG. 6G and shows the generally radial A-component lines 212 with a circumferential spacing $L_0$. FIG. 6H corresponds generally to the step shown in FIG. 5B, where the circumferential density of radial lines 212 has been doubled from the circumferential density of radial stripes 204 in FIG. 5A.

Figure 6I:
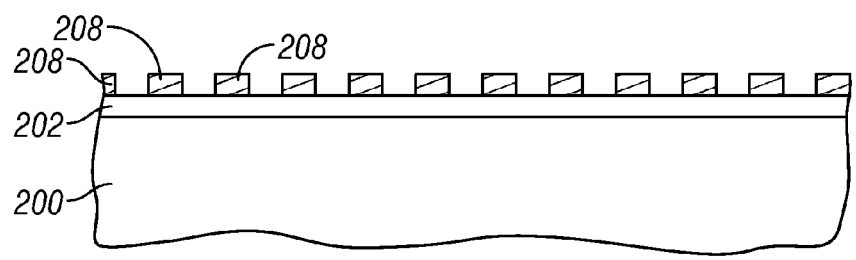
FIG. 6I is a side sectional view of one stage of one embodiment of the method for making the master mold, taken through a plane generally perpendicular to the radial direction.

In FIG. 6I, the Ge layer 204 has been etched, using the PS radial lines 212 as an etch mask, by a fluorine-based reactive-ion-etch (RIE) process. The PS material in radial lines 212 and the underlying polymer brush layer 205 has been removed by a dry etch process ($O_2$ RIE). This leaves generally radially lines 208 of Ge on carbon layer 202. The Ge lines 208 have the same circumferential spacing $L_0$ as the radial lines 212 of PS material in FIG. 6H.

Figure 6J:
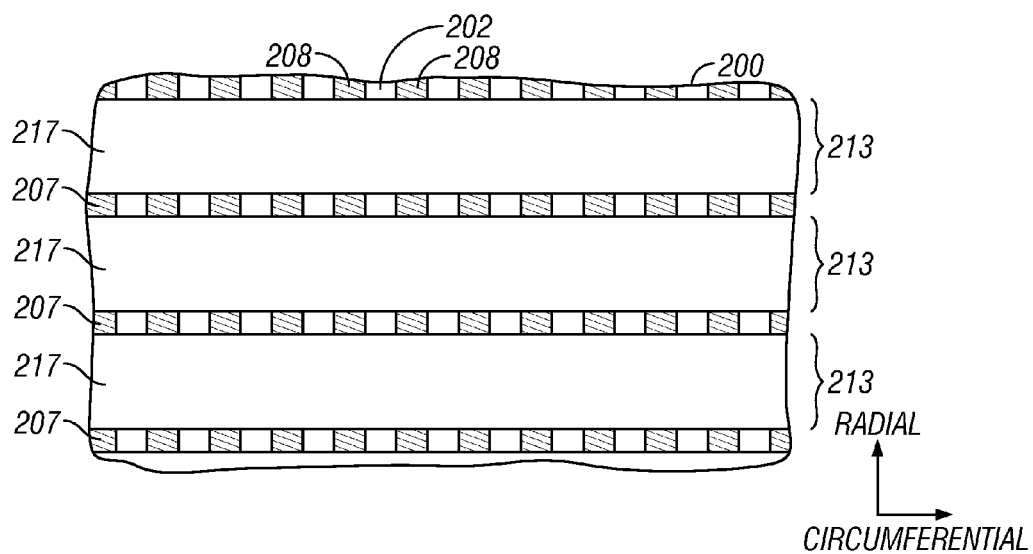
FIGS. 6J-6L are top views at various stages of one embodiment of the method for making the master mold.

Next, a second conventional e-beam or other lithography step is performed to cut the radial lines 208 into segments that will correspond to the tracks on the patterned-media disks that will be nanoimprinted by the master mold. In FIG. 6J, which is a top view, the structure of FIG. 6I is coated with a layer of e-beam resist 217. Then the resist 217 is exposed in a rotary-stage e-beam tool to expose narrow concentric boundary regions 207 that correspond to the boundaries between the tracks of the patterned-media disks to be nanoimprinted. The resist 217 may be a positive e-beam resist like poly methyl methacrylate (PMMA) or ZEP520 from Zeon Chemicals, L.P. After developing, this will leave circumferential segments 213, which correspond to the tracks on the patterned-media disks to be nanoimprinted, covered with resist 217, with the boundary regions 207 between tracks not covered with resist. By adjusting the exposure and developing conditions, the width of the uncovered boundary regions can be adjusted as desired.

Figure 6K:
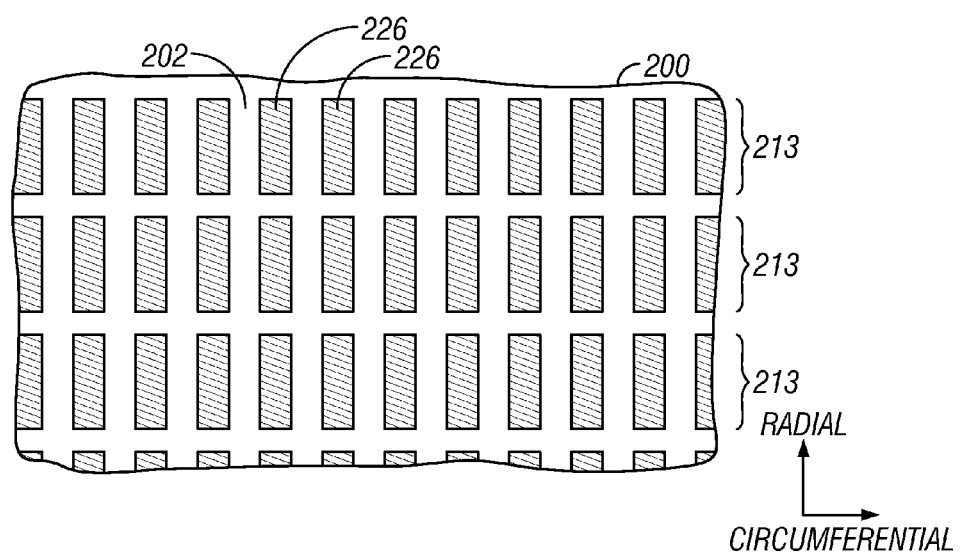

In FIG. 6K, a fluorine-based RIE is used to etch the exposed Ge in the boundary regions 207. Then the resist 217 is removed in a wet etch process, like hot N-methyl pyrrolidone (NMP), or a dry etch process, like oxygen RIE. This leaves Ge pillars 226 on carbon layer 202.

Figure 6L:
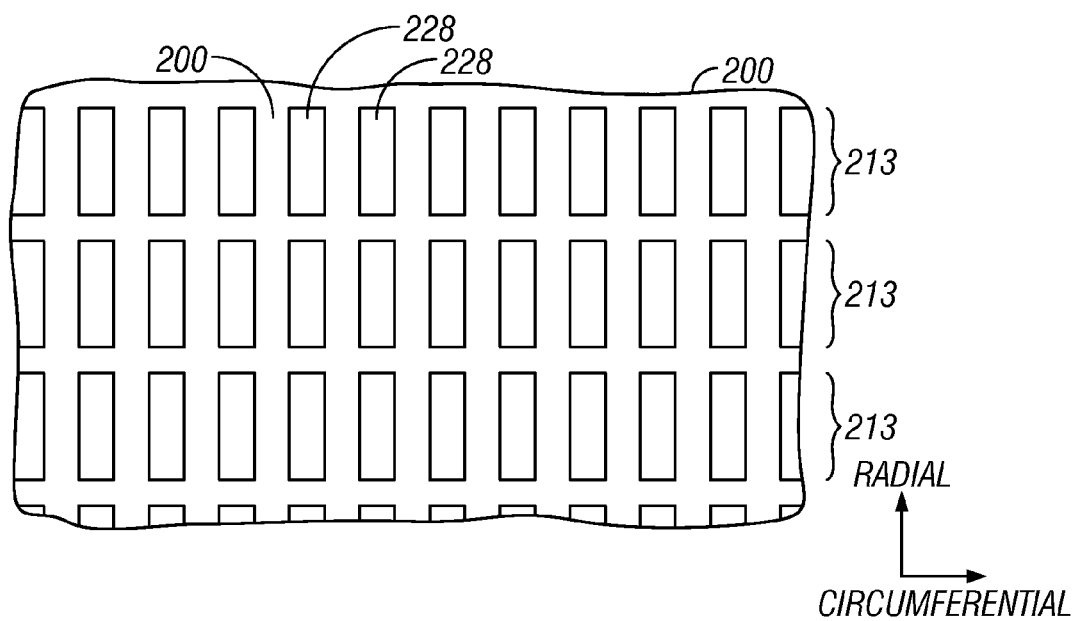

Then, in FIG. 6L, an oxygen RIE is used to etch the carbon layer 202 from the substrate 200 in the regions between the Ge pillars 226, using the Ge pillars 226 as an etch mask. The Ge pillars 226 are then removed by a fluorine RIE process, leaving carbon pillars 228 on substrate base 200. This leaves the structure as shown in FIG. 6L with the carbon pillars 228 being arranged in circumferential segments 213 which correspond to the concentric tracks of the patterned-media disks to be nanoimprinted. The resulting structure in FIG. 6M corresponds generally to the step shown in FIG. 5C. The carbon pillars 228 have a IAR of greater than 1, preferably about 2 or greater. The structure of FIG. 6L, which began as a substrate of base 200 with carbon layer 202 and Ge layer 204, has now been etched so that a portion of the substrate remains as the topographic pattern in the form of carbon pillars 228. The structure of FIG. 6L can function as the master mold with the carbon pillars 228 functioning as the topographic pattern for nanoimprinting the replica molds. As an alternative approach, the carbon pillars 228 in FIG. 6L can function as an etch mask for an additional etching step to etch the underlying substrate base 200 using a fluorine RIE process. After etching and removal of the carbon pillars 228 in this alternative approach, the result would be a master mold wherein the pillars are formed of the same material as the substrate base 200.

In FIG. 6L, the pillars 228 have a circumferential pitch of about 15 nm and a circumferential width of about 8 nm and a radial length of about 25 nm with a radial pitch of about 30 nm, resulting in a BAR of greater than about 2. The 15 nm pillar spacing or pitch in the circumferential direction corresponds approximately to $L_0$ and is half of that used in the e-beam lithography step which defined the radial stripes 204 in FIG. 6D. This array may be used as a master mold for nanoimprinting patterned-media disks with a density of about 1.4 Gigabit/in$^2$.

Figure 6M:
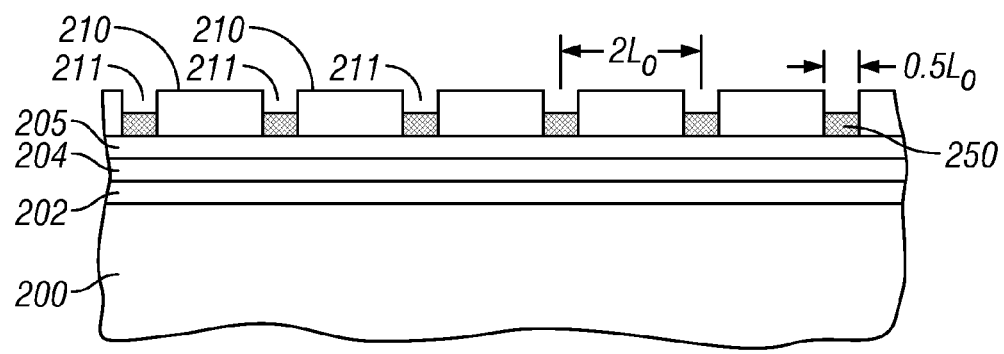
FIGS. 6M-6Q are side sectional views, at various stages of an alternative embodiment of the method shown in FIGS. 6C-6D, taken through a plane generally perpendicular to the radial direction.
Figure 6N:
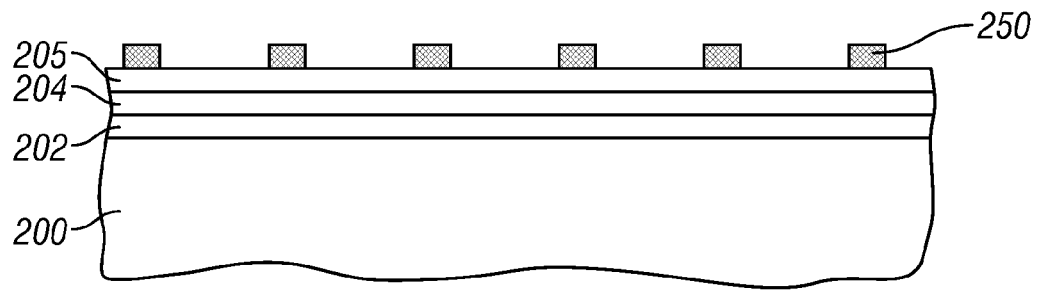
Figure 6O:
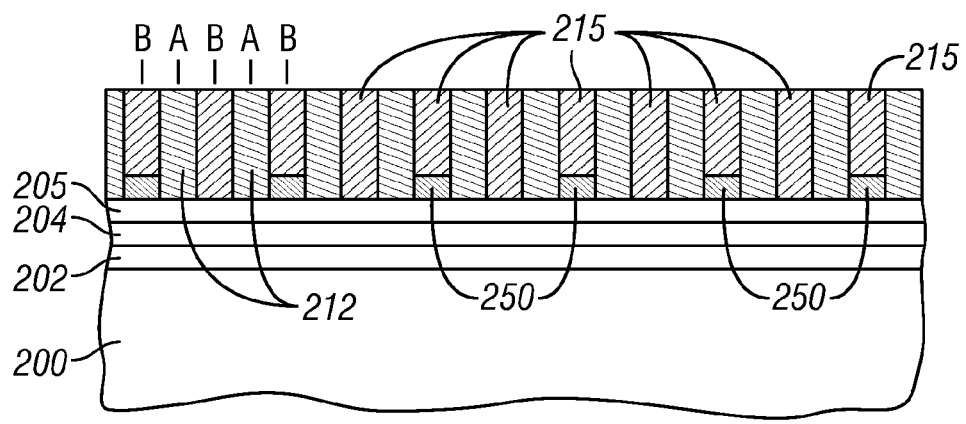
Figure 6P:
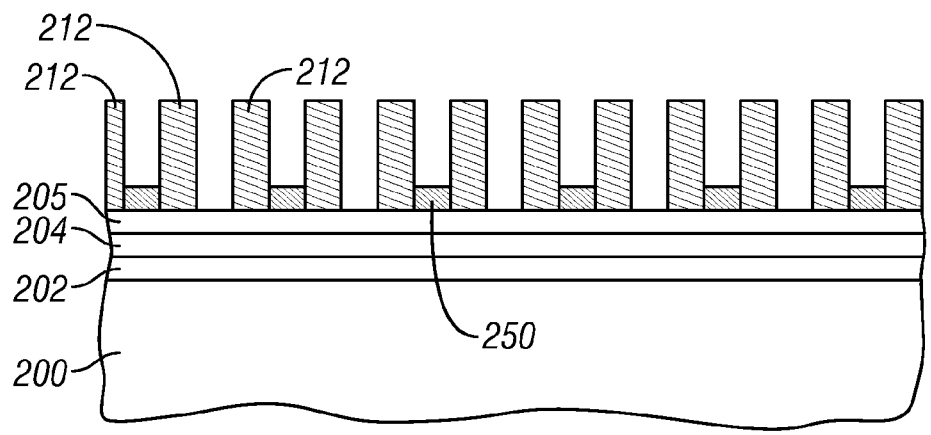
Figure 6Q:
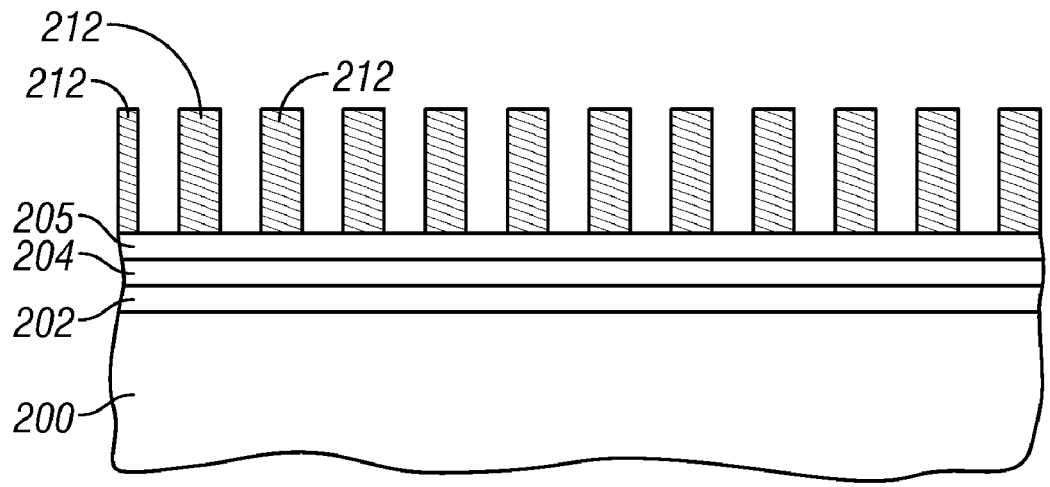

An alternative to the steps shown in FIGS. 6C-6F will also generate the necessary pattern on the substrate. This is shown in FIGS. 6M-6Q. The structure in FIG. 6B is used as the starting point. In FIG. 6M a material 250 with a wetting affinity for one of the two polymer blocks, such as SiO$_2$, is deposited in the radial spaces 211 to a thickness of about 1 nm. In FIG. 6N, the radial bars 210 of resist are removed, leaving on the substrate a pattern of generally radial stripes 250 of SiO$_2$ separated by generally radial spaces 205 of polymer brush material. In this pattern the generally radial stripes 250 have a circumferential width of 0.5$L_0$ and a circumferential pitch of 2$L_0$. Because FIG. 6N is only a very small portion of the master mold, the stripes 250 appear as parallel stripes. However, the stripes 250 are arranged generally radially, as depicted in FIG. 4. The stripes 250 may be perfectly straight radial stripes but are preferably arcs or arcuate-shaped radial stripes that replicate the arcuate path of the read/write head on the rotary actuator. Next, in FIG. 6O, a layer of block copolymer material is deposited over the radial stripes 250 of SiO$_2$ and the radial spaces 205 of polymer brush material. The preferred block copolymer material is the diblock copolymer polystyrene-block-polymethylmethacrylate (PS-b-PMMA) with $L_0$ between about 8 nm and 25 nm and is deposited by spin coating to a thickness of about 0.5$L_o$ to 3$L_o$. In FIG. 6O, the block copolymer layer has been annealed, which results in phase separation between the different components contained in the block copolymer. In this example, the B component (PMMA) has an affinity for the oxide surface of the radial SiO$_2$ stripes 250 and thus form as generally radial lines 215 on top of the radial SiO$_2$ stripes 250. Because the circumferential width of the radial SiO$_2$ stripes 250 is approximately 0.5$L_0$, the A component (PS) form in adjacent radial lines 212 in the radial spaces 205 of polymer brush material. As a result of the self-assembly of the A and B components this causes the B component to also form as generally radial lines 215 in the centers of each radial space 205 of polymer brush material. The generally radial SiO$_2$ stripes 250 thus guide the self-assembly of the PS and PMMA components to form the alternating radial lines 212, 215 in the structure as shown in FIG. 6O. Next, in FIG. 6P, the B component (PMMA) is selectively removed by a wet etch (acetic acid, iso-propyl alcohol (IPA) or other selective solvent) or dry etch process (O$_2$ RIE), leaving generally radial lines 212 of the A component (PS) and the generally radial SiO$_2$ stripes 250. In FIG. 6Q the radial SiO$_2$ stripes 250 have been removed by a selective wet or dry etching. For SiO$_2$ this would be hydrofluoric acid for the wet etching or a CHF$_4$ plasma for a dry etch. The remaining exposed brush layer 205 in the spaces between radial lines 212 is then removed by O$_2$ RIE, leaving generally radial lines 212 of the A component (PS) and the generally radial lines 204 of Ge. At this point the structure is identical to that shown in FIG. 6G and the process can continue as described above.

Figure 7A:
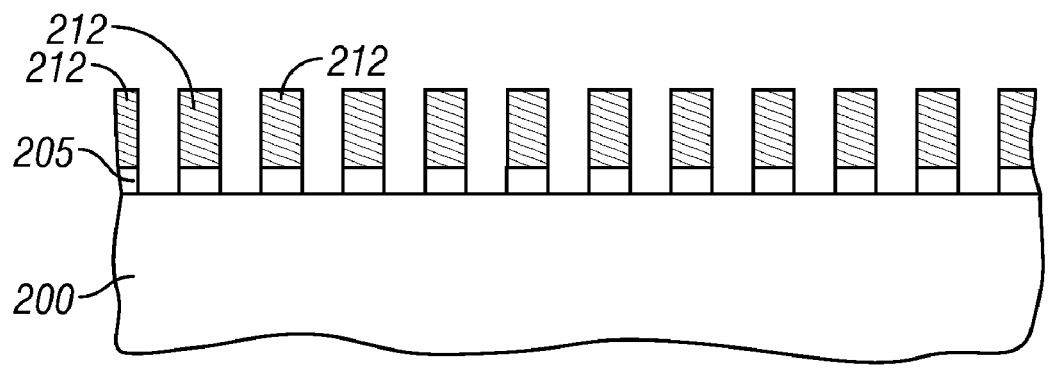
FIG. 7A is a side sectional view at one stage of a variation of the method depicted in FIGS. 6A-6L, taken through a plane generally perpendicular to the radial direction.
Figure 7B:
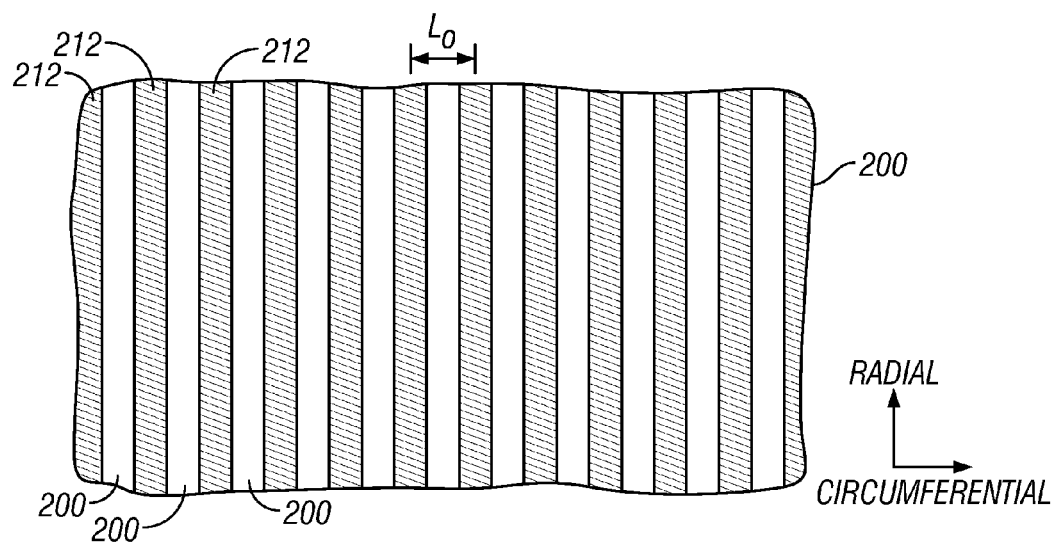
FIGS. 7B-7E are top views at various stages of a variation of the method depicted in FIGS. 6A-6L.

A variation of the embodiment of the methods shown in FIGS. 6A-6O is shown in FIGS. 7A-7E, wherein FIG. 7A is a side sectional view taken through a plane generally perpendicular to the radial direction, and FIGS. 7B-7E are top views at various stages of the method. In this variation, as shown in FIG. 7A, the master mold substrate is base 200 which is a Si substrate with a native oxide layer. FIG. 7A corresponds to the stage of the method shown by FIG. 6G. The B component (PMMA) has been dissolved by a wet etch or dry etch process, leaving generally radial lines 212 of the A component (PS). FIG. 7B is a top view of FIG. 7A and shows the generally radial lines 212 with a circumferential spacing $L_0$. FIG. 7A corresponds generally to the step shown in FIG. 5B, where the circumferential density of radial lines 212 has been doubled from the circumferential density of radial stripes 204 in FIG. 5A.

Figure 7C:
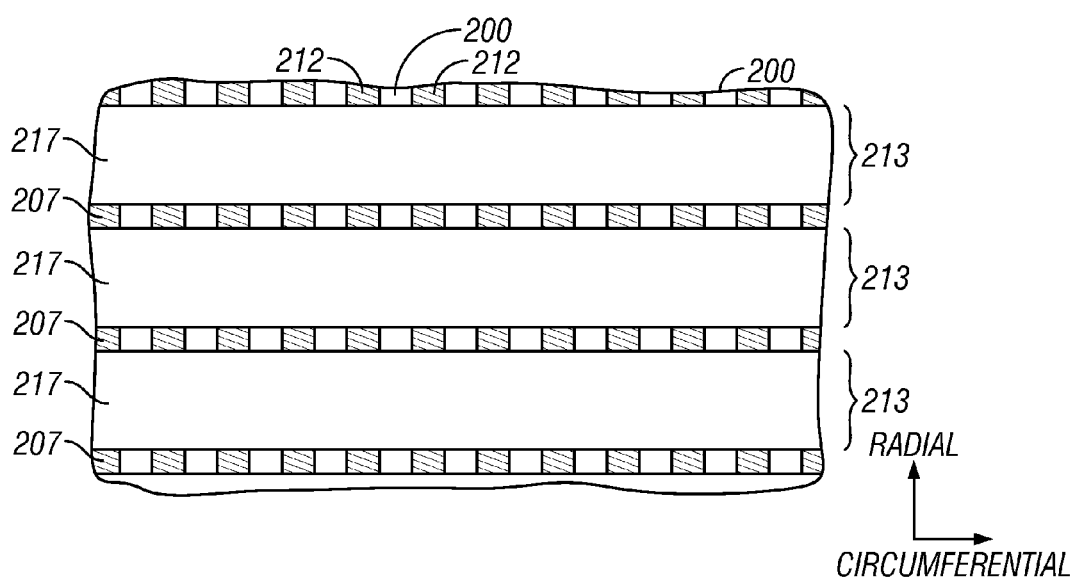

Next, a second conventional e-beam or other lithography step is performed to cut the radial lines 212 into segments that will correspond to the tracks on the patterned-media disks that will be nanoimprinted by the master mold. In FIG. 7C, which is a top view, the structure of FIGS. 7A-7B is coated with a layer of e-beam resist 217. Then the resist 217 is exposed in a rotary-stage e-beam tool to expose narrow concentric boundary regions 207 that correspond to the boundaries between the tracks of the patterned-media disks to be nanoimprinted. The resist 217 may be a positive e-beam resist like PMMA or ZEP520. After developing, this will leave circumferential segments 213, which correspond to the tracks on the patterned-media disks to be nanoimprinted, covered with resist 217, with the boundary regions 207 between tracks not covered with resist. By adjusting the exposure and developing conditions, the width of the uncovered boundary regions can be adjusted as desired.

Figure 7D:
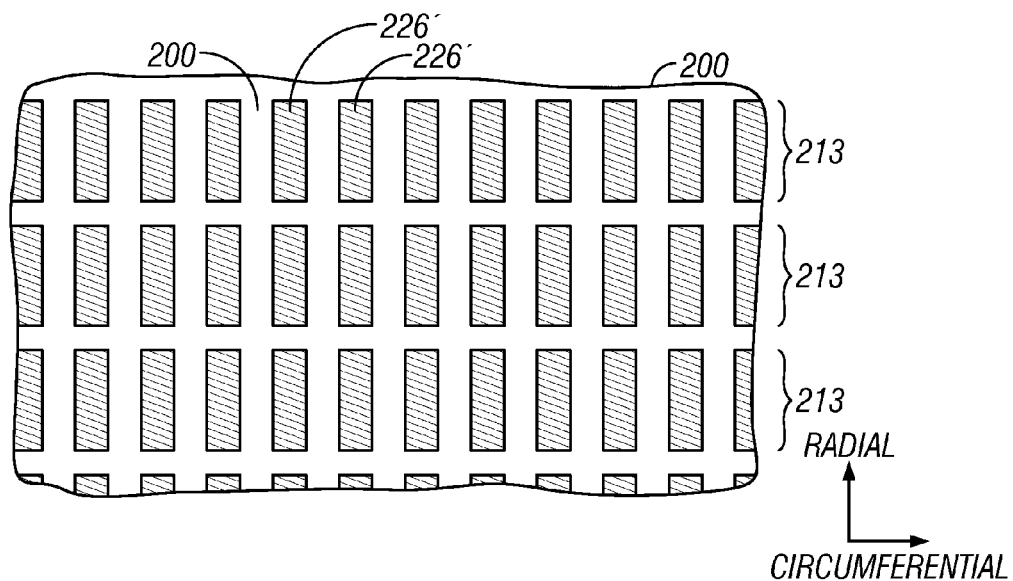

Next, in FIG. 7D, the PS (block copolymer component A) in the exposed portions of radial lines 212 in the boundary regions 207 is removed by a $O_2$ RIE process. Then the resist 217 is removed in a wet etch process, like hot NMP. This leaves pillars 226' of PS on substrate 200.

Figure 7E:
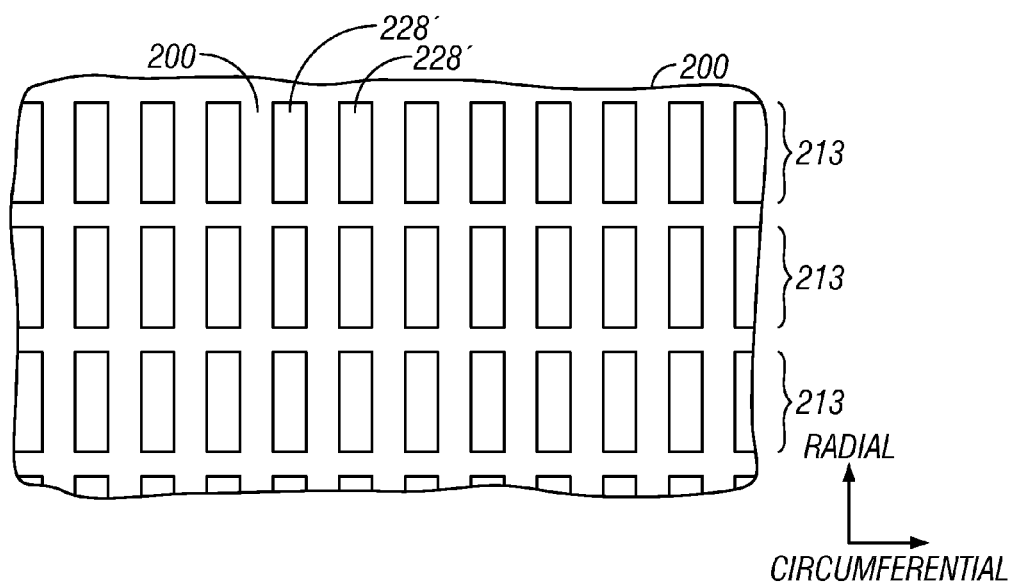

Then, in FIG. 7E, a dry etch process is used to etch the substrate 200 in the regions between the PS pillars 226', using the PS pillars 226' as an etch mask. The PS pillars 226' are then removed by a $O_2$ RIE process, leaving pillars 228' of substrate material on substrate 200. This leaves the structure as shown in FIG. 7E with the pillars 228' being arranged in circumferential segments 213 which correspond to the concentric tracks of the patterned-media disks to be nanoimprinted. The resulting structure in FIG. 7E corresponds generally to the step shown in FIG. 5C. The structure of FIG. 7E, which began as a substrate of base 200, has now been etched so that a portion of the substrate remains as the topographic pattern in the form of pillars 218'. The structure of FIG. 7E can function as the master mold with the pillars 218' functioning as the topographic pattern for nanoimprinting the replica molds.

Figure 8A:
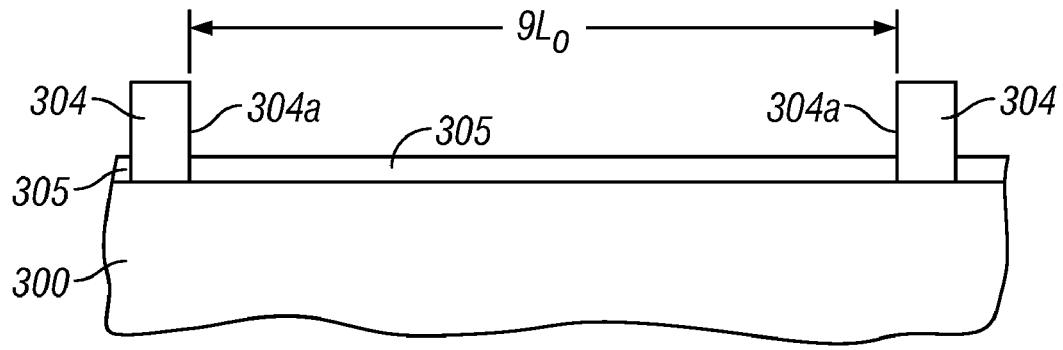
FIGS. 8A-8C are side sectional views at various stages of another embodiment of the method for making the master mold, taken through a plane generally perpendicular to the radial direction.
Figure 8B:
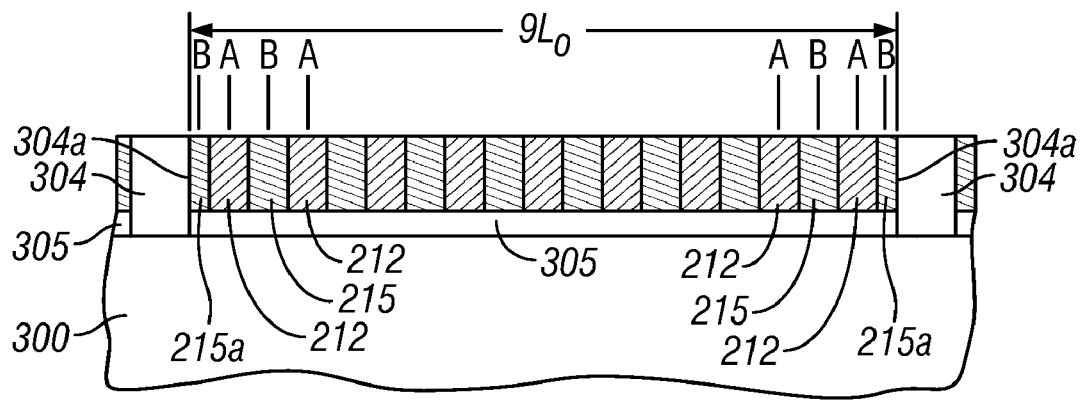
Figure 8C:
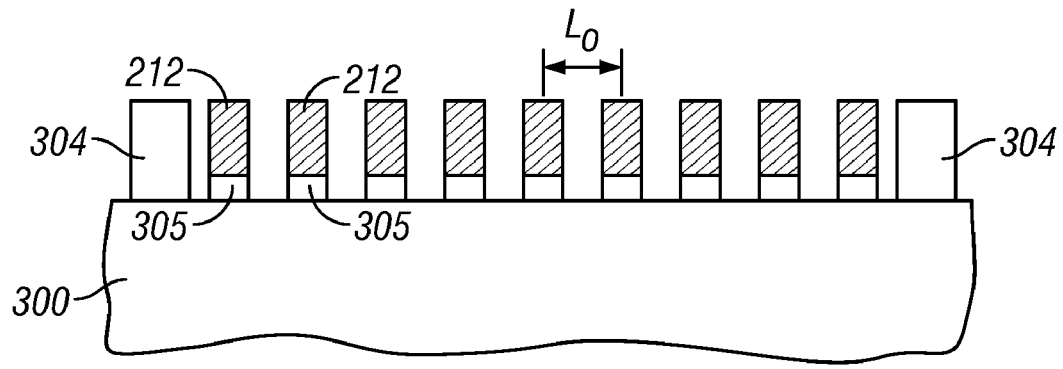

Another embodiment of the method for making the master mold is shown in FIGS. 8A-C. The structure shown in FIG. 8A, which is a side sectional view taken through a plane generally perpendicular to the radial direction, is made by starting with a substrate 300, which may be formed of Si or $SiO_2$. Then a layer 305 of neutral polymer brush material is deposited over the entire surface of substrate 300. A layer of resist is then deposited over brush layer 305 and patterned with conventional optical or e-beam lithography. After exposure and development a pattern of generally radial stripes are formed that expose the underlying brush layer 305. The brush material is removed from these regions by a $O_2$ RIE process and then a material like Ge or amorphous Si is deposited over the patterned resist into the regions of radial stripes. Then the resist is removed, leaving the structure shown in FIG. 8A with generally radial stripes 304 that define a trench with a circumferential width $nL_0$, where n is an integer greater than or equal to 2 (n=9 in the example of FIG. 8A). The bottom of the trench is formed of the neutral brush layer 305 and the walls 304a of radial stripes 304 have a native oxide surface.

Next, in FIG. 8B, a layer of block copolymer material has been deposited between the radial stripes 304 and onto neutral brush layer 305. The preferred block copolymer material is the diblock copolymer polystyrene-block-polymethylmethacrylate (PS-b-PMMA) with $L_0$ between about 8 nm and 25 nm and is deposited by spin coating to a thickness of about $0.5L_o$ to $3L_o$. The block copolymer is then annealed, which results in phase separation between the different components contained in the block copolymer. In this example, the B component (PMMA) has an affinity for the oxide surfaces of the walls 304a of radial stripes 304. Because the B component is formed on the walls 304a of the radial stripes 304 as radial lines 215a and because the circumferential width between the walls 304a of radial stripes 304 is an integer multiple of $L_0$ ($9L_0$ in the example of FIG. 8B), the A and B components between radial B-component lines 215a are forced to self-assemble in alternating radial lines 212, 215, each with a circumferential width of approximately $0.5L_0$. The circumferential width of B-component radial lines 215a, however, is approximately $0.25L_0$. The generally radial stripes 304, which are spaced apart to define a trench with circumferential width of approximately $nL_0$, thus guide the self-assembly of the PS and PMMA components to form the alternating radial lines 212, 215 in the structure as shown in FIG. 8B. Although the A and B components prefer to self-assemble in parallel lines with a period of $L_0$, the pattern of radial stripes 304 on the substrate 300 guides the alternating lines 212, 215 to form as radial lines, which means that $L_0$ cannot be constant over the entire radial length of the band. However, the pattern of alternating radial lines 212, 215 can be accomplished without any significant defects if the variation from $L_0$ does not exceed approximately 10 percent. Thus the circumferential width of the trench at the band ID should not be less than about $0.9\ nL_0$ and the circumferential width of the trench at the band OD should not be greater than about $1.1nL_0$.

Next, in FIG. 8C, the B component (PMMA), which formed the radial lines 215a and 215 in FIG. 8B, have been dissolved by a wet etch process (acetic acid, IPA or other selective solvent) or by a dry etch process ($O_2$ RIE), leaving generally radial lines 212 of the A component (PS). The structure of FIG. 8C is thus at the stage corresponding to the stage shown in FIG. 7A of the first embodiment. Thus, following the stage of FIG. 8C, the same steps as described above with respect to FIGS. 7B-7E are followed to arrive at a master mold substantially identical to the master mold shown in FIG. 7E. However, patterned-media disks nanoimprinted by the master mold made by the method shown in FIGS. 8A-8C will have missing bits at predictable regular intervals in each track as a result of the radials stripes 304 which are needed to define the circumferential trenches. In patterned-media disks, a relatively constant bit spacing is desired for accurate write synchronization and readback detection because if the spacing between the bits is not constant, phase errors may occur. If the phase error due to the missing bits becomes more than a few percent of the bit spacing, the errors may be unacceptable. A modification to the method of FIGS. 8A-8C will avoid any phase errors due to the radial stripes 304. This can be achieved by placing the stripes 304 such that the walls 304a are spaced apart by a width of $(n+\frac{1}{2})L_0$, for example $9.5L_0$ in FIG. 8A. The circumferential width of the radial stripes 304 is selected to be $0.5L_0$. Each wall surface 304a is then coated with a PMMA brush of thickness about $0.25L_0$, so that the spacing between the coated walls is $9L_0$. Then the block copolymer is applied and the process is the same as above. The radial stripes 304 substitute for one PS stripe while guiding the self-assembly of the block copolymer. The PMMA brush on the walls 304a compensate for the missing material.

In the embodiment of the method described with respect to FIGS. 6A-6L (and the variation described with respect to FIGS. 7A-7E) and in the embodiment of the method described with respect to FIGS. 8A-8C, the two block copolymer components are depicted as self-assembling into alternating lamellae, as shown, for example, by alternating radial lines 212, 215 in FIG. 6F. For the A and B components (PS and PMMA) to form as alternating lamellae the molecular weight ratio of the A to B components should be between about 40:60 and 60:40, preferably close to 50:50. However, it is also within the scope of the invention for the A component (PS) to form as radially-aligned cylinders within a matrix of the B component (PMMA). To achieve this type of structure, wherein the A component cylinders form the radial lines 212 within alternating radial lines 215 of B component material, the molecular weight ratio of component B over component A should be less than about 80:20 but greater than about 60:40, preferably close to 70:30.

The master mold shown in FIGS. 6L and 7E is a pillar-type master mold that can be used to make replica molds. The replica molds will thus have hole patterns corresponding to the pillar pattern of the master mold. When the replica mold is used to make the disks, the resulting disks will then have a pillar pattern, with the pillars corresponding to the data islands. However, the master mold may alternatively be a hole-type of master mold that can be used to directly nanoimprint the disks.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a nanoimprinting mold, the method including the use of a block copolymer having a bulk period $L_0$ and comprising:
    forming on a substrate having a center a pattern of generally radial stripes arranged in an annular band, the stripes having a circumferential spacing at the outside diameter (OD) of the annular band greater than at the inside diameter (ID) of the annular band, said circumferential spacings at said OD and said ID being approximately $nL_0$, where n is an integer equal to or greater than 2; and
    depositing on the patterned substrate a layer of material comprising a block copolymer having a bulk period $L_0$, whereby the copolymer material is guided by the stripes to self-assemble into generally radial lines of alternating first and second copolymer components, the radial lines of each component having a circumferential spacing at the outside diameter (OD) of the annular band greater than at the inside diameter (ID) of the annular band, said circumferential spacings of the radial lines at said OD and said ID being approximately $L_0$.

2. The method of claim 1 wherein the circumferential spacing of the generally radial stripes at the inside diameter (ID) of the annular band is not less than about $0.9nL_0$ and the circumferential spacing of the generally radial stripes at the outside diameter (OD) of the annular band is not greater than about $1.1nL_0$.

3. The method of claim 1 wherein the copolymer material is a diblock copolymer material.

4. The method of claim 3 wherein the diblock copolymer material is a copolymer of polystyrene (PS) and poly(methyl methacrylate) (PMMA).

5. The method of claim 1 wherein $L_0$ is between about 8 nm and 25 nm.

6. The method of claim 1 wherein the generally radial stripes have a generally arcuate shape.

7. The method of claim 1 wherein forming on the substrate a pattern of generally radial stripes arranged in an annular band comprises forming the stripes as a plurality of radially-spaced annular bands.

8. The method of claim 1 wherein the substrate is formed of Si.

9. The method of claim 1 wherein the substrate is formed of $SiO_2$.

10. The method of claim 1 wherein the substrate comprises a substrate base, a layer consisting essentially of Cr on the base and a layer consisting essentially of $SiO_2$ on the Cr layer.

11. The method of claim 1 wherein the substrate surface comprises an oxide and wherein forming said pattern on the substrate comprises:
    depositing on the substrate a layer of neutral polymer brush material having no strong affinity for any copolymer component;
    forming on the polymer brush layer a resist pattern of generally radial bars;
    etching portions of the polymer brush material unprotected by the resist to expose generally radial stripes of oxide; and
    removing the resist.

12. The method of claim 1 wherein forming said pattern on the substrate comprises:
    depositing on the substrate a layer of neutral polymer brush material having no strong affinity for any copolymer component;
    forming on the polymer brush layer a resist pattern of generally radial bars;
    forming in the radial spaces between the radial bars a material having a preferred affinity for one of the copolymer components;
    removing the radial bars of resist to expose generally radial stripes of said material having a preferred affinity for one of the copolymer components.

13. A method for making a nanoimprinting mold, the method including the use of a block copolymer and comprising:
    forming on a substrate having a center a pattern of generally radial stripes having a generally arcuate shape and arranged in an annular band, the stripes having a circumferential spacing at the outside diameter (OD) of the annular band not greater than about $1.1nL_0$ and a circumferential spacing at the inside diameter (ID) of the annular band not less than about $0.9nL_0$, where $L_0$ is the bulk period of the block copolymer and n is an integer equal to or greater than 2; and
    depositing on the patterned substrate a layer of material comprising a block copolymer having a bulk period $L_0$, whereby the copolymer material is guided by the stripes to self-assemble into generally radial lines of alternating first and second copolymer components, the radial lines having a generally arcuate shape.

14. The method of claim 13 wherein the copolymer material is a diblock copolymer material.

15. The method of claim 14 wherein the diblock copolymer material is a copolymer of polystyrene (PS) and poly(methyl methacrylate) (PMMA).

16. The method of claim 13 wherein $L_0$ is between about 8 nm and 25 nm.

* * * * *